United States Patent
Kamm et al.

(10) Patent No.: US 7,682,282 B2
(45) Date of Patent: Mar. 23, 2010

(54) MULTI-SPEED TRANSMISSION

(75) Inventors: Michael Kamm, Bodnegg (DE); Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 418 days.

(21) Appl. No.: 11/773,636

(22) Filed: Jul. 5, 2007

(65) Prior Publication Data
US 2008/0009382 A1 Jan. 10, 2008

(30) Foreign Application Priority Data
Jul. 6, 2006 (DE) .................. 10 2006 031 309

(51) Int. Cl.
*F16H 3/62* (2006.01)
(52) U.S. Cl. .................................. 475/277; 475/282
(58) Field of Classification Search ................ 475/269, 475/271, 275, 277, 282, 283, 288, 289, 296, 475/297, 311, 312, 317, 318
See application file for complete search history.

(56) References Cited

U.S. PATENT DOCUMENTS

| | | | |
|---|---|---|---|
| 6,176,803 B1 | 1/2001 | Meyer et al. | |
| 6,634,980 B1 | 10/2003 | Ziemer | |
| 6,960,149 B2 * | 11/2005 | Ziemer | 475/276 |
| 7,014,589 B2 | 3/2006 | Stevenson | |
| 7,018,319 B2 | 3/2006 | Ziemer | |
| 2004/0082428 A1 * | 4/2004 | Usoro et al. | 475/296 |
| 2004/0102276 A1 * | 5/2004 | Lee et al. | 475/271 |
| 2008/0171627 A1 * | 7/2008 | Wittkopp et al. | 475/276 |

FOREIGN PATENT DOCUMENTS

| | | |
|---|---|---|
| DE | 42 34 572 A1 | 4/1994 |
| DE | 199 49 507 A1 | 4/2001 |
| DE | 100 83 202 T1 | 1/2002 |
| DE | 101 15 983 A1 | 10/2002 |
| DE | 101 15 995 A1 | 10/2002 |
| DE | 10 2004 029 952 A1 | 1/2005 |
| DE | 10 2005 002 337 A1 | 8/2006 |
| DE | 10 2005 032 001 A1 | 2/2007 |

* cited by examiner

*Primary Examiner*—Sherry L Estremsky
*Assistant Examiner*—Edwin A Young
(74) *Attorney, Agent, or Firm*—Davis & Bujold, P.L.L.C.

(57) ABSTRACT

A multi-speed transmission has input and output shafts, gearsets (RS1, RS2, RS3, RS4), shafts (1, 2, 3, 4, 5, 6, 7, 8), and shifting elements (A, B, C, D, E). A carrier of gearset (RS4) and the input shaft couple as shaft (1). A carrier of gearset (RS3) and the output shaft couple as shaft (2). Sun gears of gearsets (RS1, RS4) couple as shaft (3). Ring gears of coupled gearsets (RS1, RS2) respectively form shafts (4, 8). Sun gears of gearsets (RS2, RS3) couple as shaft (5). A carrier of gearset (RS1) and a ring gear of gearset (RS3) couple as shaft (6). A carrier of gearset (RS2) and a ring gear of gearset (RS4) couple as shaft (7). Arranged within the power flow: elements (A, B) are respectively between shaft (3, 4) and a transmission housing; element (C) between shafts (1, 5); element (D) between either shafts (2, 8) or (6,8); element (E) between two of shafts (5, 7, 8).

36 Claims, 10 Drawing Sheets

| GEAR | ENGAGED SHIFTING ELEMENTS ||||| RATIO i | STEP φ |
|---|---|---|---|---|---|---|---|
| | BRAKE || CLUTCH ||| | |
| | A | B | C | D | E | | |
| 1 | ● | ● | ● | | | 4.70 | |
| | | | | | | | 1.50 |
| 2 | ● | ● | | | ● | 3.13 | |
| | | | | | | | 1.49 |
| 3 | | ● | ● | | ● | 2.10 | |
| | | | | | | | 1.26 |
| 4 | | ● | | ● | ● | 1.67 | |
| | | | | | | | 1.29 |
| 5 | | ● | ● | ● | | 1.29 | |
| | | | | | | | 1.29 |
| 6 | | | ● | ● | ● | 1.00 | |
| | | | | | | | 1.20 |
| 7 | ● | | ● | ● | | 0.84 | |
| | | | | | | | 1.25 |
| 8 | ● | | | ● | ● | 0.67 | |
| R | ● | ● | | ● | | -3.13 | TOTAL 7.05 |

Fig. 4

| GEAR | ENGAGED SHIFTING ELEMENTS |||||  RATIO i | STEP φ |
|---|---|---|---|---|---|---|---|
| | BRAKE || CLUTCH ||| | |
| | A | B | C | D | E | | |
| 1 | ● | ● | ● | | | 4.70 | |
| | | | | | | | 1.50 |
| 2 | ● | ● | | | ● | 3.13 | |
| | | | | | | | 1.49 |
| 3 | | ● | ● | | ● | 2.10 | |
| | | | | | | | 1.26 |
| 4 | | ● | | ● | ● | 1.67 | |
| | | | | | | | 1.30 |
| 5 | | ● | ● | ● | | 1.28 | |
| | | | | | | | 1.28 |
| 6 | | | ● | ● | ● | 1.00 | |
| | | | | | | | 1.19 |
| 7 | ● | | ● | ● | | 0.84 | |
| | | | | | | | 1.26 |
| 8 | ● | | | ● | ● | 0.67 | |
| | | | | | | | TOTAL 7.05 |
| R | ● | ● | | ● | | -3.44 | |

Fig. 8

MULTI-SPEED TRANSMISSION

This application claims priority from German Application Serial No. 10 2006 031 309.7 filed Jul. 6, 2006.

FIELD OF THE INVENTION

The invention concerns a multi-speed transmission with planetary design, particularly an automatic transmission for a motor vehicle, comprising an input shaft, an output shaft, four planetary gearsets, at least eight rotary shafts, as well as five shifting elements, whose selective engagement produces different transmission ratios between the input shaft and output shaft, so that eight forward gears and at least one reverse gear can be implemented.

BACKGROUND OF THE INVENTION

Automatic transmissions, particularly for motor vehicles, in the state of the art, include planetary gearsets that are shifted by way of friction or shifting elements, such as clutches and brakes, and a starting element, such as a hydrodynamic torque converter or a fluid clutch, subjected to a slip effect and optionally provided with a lockup clutch.

Within the scope of DE 101 15 983 A1 of the Applicant, a multi-speed transmission with an input shaft connected to an input side gearset and an output shaft connected to an output side gearset is described with a maximum of seven shifting elements, the optional shifting of which implements at least seven can be without group shifts. The input side gearset is composed of a shiftable or non-shiftable planetary gearset or of a maximum of two non-shiftable planetary gearsets that are coupled to each other. The output side gearset is configured as a two-carrier, four-shaft transmission with two shiftable planetary gearsets and features four free shafts. The first free shaft of this two-carrier, four-shaft transmission is connected to the first shifting element; the second free shaft to the second and third shifting element; the third free shaft to the fourth and fifth shifting element, and the fourth free shaft is connected to the output shaft. For a multi-speed transmission with a total of six shifting elements, according to the invention, it is proposed to connect the third free shaft or the first free shaft of the output side gearset additionally to a sixth shifting element. For a multi-speed transmission with a total of seven shifting elements, according to the invention, it is proposed to connect the third free shaft additionally to a sixth shifting element, and the first free shaft additionally to a seventh shifting element.

Several other multi-speed transmissions are also known from DE 101 15 995 A1 of the Applicant, which are provided with four shiftable planetary gearsets that are coupled to each other and six or seven non-positive shifting elements, by the selective engagement thereof, a rotational speed of an input shaft of the transmission can be transferred, in such a way, to an output shaft of the transmission that nine or eleven forward gears and at least one reverse gear can be engaged. Depending on the gearbox design, two or three shifting elements are engaged in each gear, and when shifting from one gear into the next higher or next lower gear, only one engaged shifting element is disengaged and one shifting element that was not previously engaged is engaged to avoid range shifts.

In addition, the unpublished patent application DE 10 2005 002 337.1 of the Applicant proposes a multi-speed transmission with an input shaft, an output shaft, four individual planetary gearsets that are coupled to each other and five shifting elements, with eight forward gears being shifted into without group shifts. That is, in such a way, that when shifting from a forward gear into the next higher or lower forward gear, only one of the previously engaged shifting elements is disengaged and only one of the previously disengaged shifting elements is engaged. This multi-speed transmission also features one reverse gear. In all forward gears and in the reverse gear, three shifting elements are engaged at any one time. With regard to the kinematic coupling of the four planetary gearsets to each other and to the input and output shafts, it is provided that a carrier of the fourth planetary gearset and the input shaft are connected to each other and form a first shaft of the transmission; a carrier of the third planetary gearset and the output shaft are connected to each other and form a second shaft of the transmission; a sun gear of the first planetary gearset and a sun gear of the fourth planetary gearset are connected to each other and form a third shaft of the transmission; a ring gear of the first planetary gearset forms a fourth shaft of the transmission; a ring gear of the second planetary gearset and a sun gear of the third planetary gearset are connected to each other and form the fifth shaft of the transmission; a carrier of the first planetary gearset and a ring gear of the third planetary gearset are connected to each other and form a sixth shaft of the transmission; a sun gear of the second planetary gearset and a ring gear of the fourth planetary gearset are connected to each other and form a seventh shaft of the transmission, and a carrier of the second planetary gearset forms an eighth shaft of the transmission. Regarding the kinematic coupling of the five shifting elements to the four planetary gearsets and to the input and output shafts, it is provided that the first shifting element is arranged in the power flow between the third shaft and a housing of the transmission; the second shifting element between the fourth shaft and the housing of the transmission; the third shifting element between the first and fifth shafts; the fourth shifting element either between the eighth and second shaft or between the eighth and sixth shaft, as well as the fifth shifting element either between the seventh and fifth shaft or between the seventh and eighth or between the fifth and eighth shaft.

Automatically shiftable motor vehicle transmissions in planetary design have, in general, already been described many times in the state of the art and are subjected to constant further development and improvement. These transmission should, therefore, feature a sufficient number of forward gears, as well as one reverse gear and transmission ratios that are very well suited for motor vehicles, with a high total transmission ratio spread, and with favorable progressive ratios. In addition, they should enable a high startup gear ratio in forward direction and contain a direct gear for use in both passenger cars and commercial vehicles. In addition, these transmissions should not have a complicated construction and require in particular a small number of shifting elements and avoid double shifting with a sequential shifting method so that only one shifting element is changed at one time when shifting within defined gear ranges.

It is an object of the invention to propose an automatic multi-speed transmission of the type named above with at least eight forward gears and at least one reverse gear in which the lowest possible number of shifting elements is required with the use of a total of four planetary gearsets. In addition, the transmission should feature a large spread with comparatively harmonic gear stepping and, at least in the main driving gears, a favorable degree of efficiency with comparatively little drag and gearing loss.

SUMMARY OF THE INVENTION

The multi-speed planetary transmission, according to the invention, is based on the gearbox diagram of the patent application DE 10 2005 002 337.1 of the above kind and features an input shaft, an output shaft, four planetary gearsets that are coupled to each other, at least eight rotary shafts, as well as five shifting elements (two brakes and three clutches), whose selective engagement produces different transmission ratios between the input shaft and the output shaft so that eight forward gears an one reverse gear are realizable. In each gear, three of the of the five shifting elements are respectively engaged, whereby when there is a change from a forward gear into the next higher or lower forward gear, only one of the previously engaged shifting elements is disengaged at any time and only one of the previously disengaged shifting elements is engaged.

According to the invention, it is proposed that:

a carrier of the fourth planetary gearset and the input shaft are permanently connected to each other and form the first shaft of the transmission;

a carrier of the third planetary gearset and the output shaft are permanently connected to each other and form the second shaft of the transmission;

a sun gear of the first planetary gearset and a sun gear of the fourth planetary gearset are permanently connected to each other and form the third shaft of the transmission;

a ring gear of the first planetary gearset forms the fourth shaft of the transmission;

a sun gear of the second planetary gearset and a sun gear of the third planetary gearset are permanently connected to each other and form the fifth shaft of the transmission;

a carrier of the first planetary gearset and a ring gear of the third planetary gearset are permanently connected to each other and form the sixth shaft of the transmission;

a carrier of the second planetary gearset and a ring gear of the fourth planetary gearset are permanently connected and form the seventh shaft of the transmission;

a ring gear of the second planetary gear forms the eighth shaft of the transmission;

the first shifting element is arranged within the power flow between the third shaft and a housing of the transmission;

the second shifting element is arranged within the power flow between the fourth shaft and the housing of the transmission;

a the third shifting element is arranged within the power flow between the first and fifth shaft of the transmission;

the fourth shifting element is arranged within the power flow between the fifth and eighth shaft of the transmission, and the fifth shifting element is arranged within the power flow between either the fifth and seventh shaft or between the seventh and eighth shaft of the transmission.

The multi-speed transmission differs from the multi-speed transmission of the generic kind, according to DE 10 2005 002 337.1, in that the fifth shaft of the transmission is now formed by the sun gears of the second and third planetary gearsets, which are connected to each other; the seventh shaft of the transmission is now formed by the carrier of the second planetary gearset and the ring gear of the fourth planetary gearset, which is connected to this carrier, and the eight shaft of the transmission is now formed by the ring gear of the second planetary gearset.

As in the generic multi-speed transmission according to DE 10 2005 002 337.1, it is also applicable to the inventive multi-speed transmission that the first forward gear is produced by engaging the first, second and third shifting elements; the second forward gear is produced by engaging the first, second and fifth shifting elements; the third forward gear is produced by engaging the second, third and fifth shifting elements; the fourth forward gear is produced by engaging the second, fourth and fifth shifting elements; the fifth forward gear is produced by engaging the second, third and fourth shifting elements; the sixth forward gear is produced by engaging the third, fourth and fifth shifting elements; the seventh forward gear is produced by engaging the first, third and fourth shifting elements; the eighth forward gear is produced by engaging the first, fourth and fifth shifting elements; and the reverse gear are produced by engaging the first, second and fourth shifting elements.

Three of the four planetary gearsets are configured as so-called negative planetary gearsets, whose respective planetary gears mesh with the sun gear and ring gear of the respective planetary gearset. One of the four planetary gearsets—specifically, the second planetary gearset—is configured as a so-called positive planetary gearset with meshing inner and outer planetary gears. These inner planetary gears also mesh with the sun gear of this positive planetary gearset and these outer planetary gears also mesh with the ring gear of the positive planetary gearset. Regarding the spatial arrangement of the four planetary gearsets in the housing of the transmission, an advantageous configuration proposes that the four planetary gearsets be arranged in a sequence of "first, fourth, second, third planetary gearset".

The spatial arrangement of the shifting elements of the inventive multistep transmission inside their transmission housing is, in principle, limited only by the measurements and the external shape of the transmission housing. Numerous suggestions regarding the spatial arrangement and construction design of the shifting elements can be found, for example, in the patent application of the above kind, DE 10 2005 002 337.1.

For example, in a variation of the shifting-element arrangement favorable for a standard transmission, it can be provided that the first and second shifting elements are arranged from a spatial point of view at least partially within an area located radially above the first and/or fourth planetary gearset; that the third shifting element can be arranged from a spatial point of view at least partially within an area located axially between the fourth and second planetary gearset; that the fourth shifting element is arranged, at least partially, within an area located radially above the second planetary gearset or within an area located axially between the second and third planetary gearset; that the fifth shifting element is arranged from a spatial point of view either within an area located axially between the fourth and second planetary gearset or within an area located axially between the second and third planetary gearset, therein in both cases preferably immediately adjacent to the second planetary gearset.

Another embodiment of the multi-speed transmission produces transmission ratios that are particularly suitable for passenger cars, with a large total transmission ratio spread in harmonic gear stepping. In addition, with the multi-speed transmission, the construction material requirements are comparatively small, due to the small number of shifting elements, i.e., two brakes and two clutches. In addition, the multi-speed transmission also displays good efficiency in all gears, on one hand, due to the low drag loss, because only two shifting elements are not engaged in each gear and, on the other hand, as a result of the low gearing losses in the simply constructed individual planetary gearsets.

In addition, it is advantageously possible with the multi-speed transmission to start the vehicle using a hydrodynamic converter, an external starting clutch or with other suitable external starting elements. It is also conceivable to enable a starting process with a starting element that is integrated into the transmission. Advantageously suitable for this process is one of the two brakes, which is activated in the first and second forward gear and in the reverse gear.

In addition, the inventive multi-speed transmission is designed to be adaptable to different power train arrangements, possibly in both power flow directions and from a spatial point of view. It is possible to arrange the transmission input and output alternately co-axially or axially parallel with respect to each other without special constructive measures.

For example, for use with input and output shafts that run co-axially with respect to each other, it is practical that the first planetary gearset is the planetary gearset that faces the engine of the transmission of the inventive planetary gearset group. Depending on the spatial arrangement of the five shifting elements inside the transmission housing, it can be provided that in each case, no more than one shaft of the transmission passes in an axial direction through the center the four planetary gearsets. In that way, in connection with the shifting element arrangement described above, in connection with the arrangement of the four planetary gearsets co-axially side-by-side in the sequence of "first, fourth, second, third planetary gearset" and the arrangement near the drive of the first and second shifting elements, only one shaft, that is, the first shaft or the input shaft of the transmission, passes in an axial direction through the center of the first and fourth planetary gearsets. The constructive design of the pressurizing medium and lubricant supply to the servo units of the individual shifting elements is correspondingly simple.

For use with axially parallel or input and output shafts that run at an angle with respect to each other, the first or the third planetary gearset can be arranged on the side of the transmission housing that faces the drive motor that is functionally connected to the driveshaft. If the first planetary gearset faces the transmission drive, it can be provided, as with the co-axial arrangement of input and output shafts, depending on the spatial arrangement of the five shifting elements inside the transmission housing, that no more than one shaft of the transmission passes in an axial direction through each of the four planetary gearsets, in particular that only one shaft, specifically the first shaft of the transmission, passes through the first and fourth planetary gearsets.

On the other hand, if the third planetary gearset faces the drive of the transmission, when the input and output are not arranged co-axially with respect to each other, no shaft of the transmission has to pass in an axial direction through the first and fourth planetary gearsets. In connection with the arrangement, cited above, of the third, fourth and fifth shifting elements, only one shaft, specifically the first shaft or the input shaft of the transmission, passes in an axial direction through the center of the second and third planetary gearset.

In any case, the third shaft of the transmission, which is formed by sections by the sun gears of the first and fourth planetary gearsets, can be rotatably mounted on a hub that is affixed to the housing. If the first planetary gearset faces the drive of the transmission, the cited hub, which is affixed to the housing, is an element of the housing wall at the input side, otherwise, it is an element of the housing wall opposite the propulsion engine.

BRIEF DESCRIPTION OF THE DRAWINGS

The invention will now be described, by way of example, with reference to the accompanying drawings. The same or comparable components are provided with the same reference numerals. In the drawings:

FIG. 4 shows an exemplary shift pattern for a multi-speed transmission according to FIGS. 1, 2, and 3;

FIG. 8 shows an exemplary shift pattern for the multi-speed transmission according to FIGS. 5, 6, and 7;

DETAILED DESCRIPTION OF THE INVENTION

Figure 1:
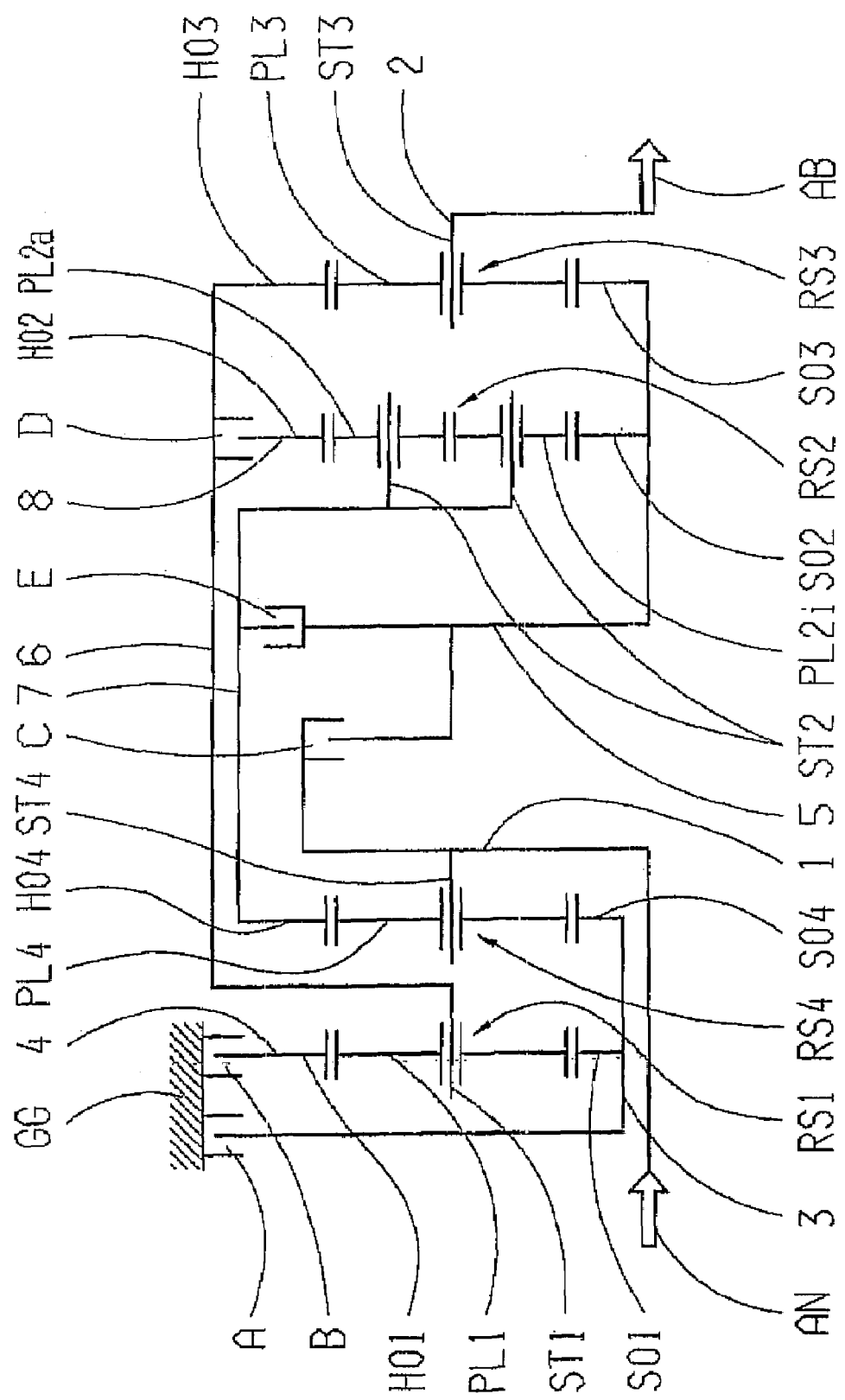
FIG. 1 shows a schematic representation of an exemplary embodiment of a multi-speed transmission according to the invention.

FIG. 1 shows a first exemplary embodiment of a multi-speed transmission, according to the invention, in schematic representation. The transmission comprises an input shaft AN and an output shaft AB, as well as four planetary gearsets RS1, RS2, RS3, RS4, and five shifting elements A, B, C, D, E, which are all arranged in a housing GG of the transmission. In this exemplary embodiment, the four planetary gearsets RS1, RS2, RS3, RS4, are arranged co-axially, one after the other, in an axial direction in the sequence of "RS1, RS4, RS2, RS3". The planetary gearsets RS1, RS3, and RS4 are configured as simple negative planetary gearsets. As is generally known, a negative planetary gearset features planetary gears that mesh with sun and ring gear of this planetary set. The ring gears of the planetary gearsets RS1, RS3, RS4, are identified with HO1, HO3 and HO4; sun gears are identified with SO1, SO3 and SO4; the planetary gears are identified with PL1, PL3, and PL4; and carriers, on which the planetary gears are rotatably mounted, are identified with ST1, ST3 and ST4. The planetary gearset RS2 is configured as a simple positive planetary gearset in double planetary construction. As is generally known, a positive planetary gearset features inner and outer planetary gears that mesh with each other, wherein the inner planetary gears also mesh with the sun gear of this planetary gearset and the outer planetary gears also mesh with the ring gear of this planetary set. The ring gear of the planetary gearset RS2 is identified with HO2; a sun gear is identified with SO2; inner planetary gears are identified with PL2$i$; outer planetary gears are identified with PL2$a$, the carriers, on which the inner and outer planetary gears PL2$i$, PL2$a$ are rotatably mounted, are identified with ST2. The shifting elements A and B are configured as brakes, which in the exemplary embodiment presented herein are both configured as non-positive shiftable disc brakes, which can, of course in another embodiment, be executed as non-positive shiftable band brakes and also as non-positive shiftable claw brakes or conical brakes. The shifting elements C, D and E are configured as clutches which, in the exemplary embodiment shown, are all executed as non-positive shiftable disc clutches and can naturally be configured in another embodiment as non-positive shiftable claw and/or conical clutches. With these five shifting elements A to E, a selective shifting of eight forward gears and at least one reverse gear can be realized. The multi-speed transmission has, therefore, at least eight rotary shafts that are identified with reference numerals 1 to 8.

With regard to the kinematic coupling of the individual elements of the four planetary gearsets RS1, RS2, RS3, RS4 to each other and to the input and output shafts AN, AB is provided the following: the carriers ST4 of the fourth planetary gearset RS4 and the input shaft AN are permanently connected and form shaft 1. The carriers ST3 of the third planetary gearset RS3 and the output shaft AB are permanently connected to each other and form shaft 2. The sun gear SO1 of the first planetary gearset RS1 and the sun gear SO4 of the fourth planetary gearset RS4 are permanently connected to each other and form shaft 3. The ring gear HO1 of the first planetary gearset RS1 forms shaft 4. The sun gear SO2 of the second planetary gearset RS2 and the sun gear SO3 of the third planetary gearset RS3 are permanently connected to each other and form shaft 5. The carrier ST1 of the first planetary gearset RS1 and the ring gear HO3 of the third planetary gearset RS3 are permanently connected and form shaft 6. The carrier ST2 of the second planetary gearset RS2 and the ring gear HO4 of the fourth planetary gearset RS4 are permanently connected to each other and form shaft 7. The ring gear HO2 of the second planetary gearset RS2 forms shaft 8.

With regard to the kinematic coupling of the five shifting elements A to E to the thus described shafts 1 to 8 of the transmission, the multi-speed transmission, according to FIG. 1, is provided the following: brake A as first shifting element is arranged within the power flow between shaft 3 and a housing GG of the transmission. Brake B as second shifting element is arranged within the power flow between shaft 4 and the housing GG. The clutch C as third shifting element is arranged in the power flow between shaft 1 and shaft 5. The clutch D as fourth shifting element is arranged between shaft 6 and shaft 8. The clutch E as fifth shifting element is arranged within in the power flow between shaft 5 and shaft 7, and blocks the second planetary gearset RS2 in engaged or shifted state.

In the exemplary embodiment, shown in FIG. 1, the first planetary gearset RS1 is the gearset of the transmission that is near the drive, and the third planetary gearset RS3 is the gearset near the output of the transmission, wherein the input shaft AN and the output shaft AB are arranged co-axially with respect to each other. It is obvious to the person skilled in the art that this transmission can be modified without great effort so that the input and output shafts are no longer arranged co-axially with respect to each other, but axially parallel or at an angle with respect to each other. With an arrangement of this type, the person skilled in the art will, if needed, arrange the input of the transmission close to the third planetary gearset RS3, i.e., on the side of the third planetary gearset RS3 that faces away from the planetary gearset RS1.

In principle, the spatial arrangement of the shifting elements within the transmission is optional in the exemplary embodiment of a multi-speed transmission, according to the invention shown in FIG. 1, and is limited only by the measurements and the external form of the transmission housing GG.

In the exemplary embodiment shown in FIG. 1, two brakes A, B are arranged in spatial terms, in the area of the first planetary gearset RS1, which is near to the drive in this case and, axially side by side, whereby the kinematic connection of two brakes A, B to the first planetary gearset RS1 requires that brake B be nearer to the fourth planetary gearset RS4, which is adjacent to the first planetary gearset RS1, than to brake A or that brake A be arranged nearer to the drive of the transmission than brake B. From a spatial point of view, brake B is at least partially arranged in an area located radially above the first planetary gearset RS1 and brake A correspondingly on the side (near the drive) of the first planetary gearset RS1 that faces away from the fourth planetary gearset RS4. An internal disc carrier of brake A forms a section of shaft 3 of the transmission and is connected in a rotationally fixed manner to the sun gear SO1 of the first planetary gearset RS1 on the side of the first planetary gearset RS1 that faces away from the fourth planetary gearset RS4. Shaft 3 is configured by sections as a kind of sun shaft that connects the sun gears SO1, SO4 of the planetary gearsets RS1, RS4 to each other. Shaft 3 can thereby be rotatably mounted either on the input shaft AN or a hub (not shown in more detail in FIG. 1) that is attached to the transmission housing. An interior disc carrier of brake B forms a section of shaft 4 of the transmission and is attached in a rotationally fixed manner to the ring gear HO1 of the first planetary gearset RS1. The external disc carriers of brakes A and B can each be integrated into the housing GG or also configured as separate components, which are then attached in a rotationally fixed manner to the housing GG. The servo units necessary for activating the friction elements of the two brakes A, B are not presented in detail in FIG. 1 for the sake of simplicity and can be mounted in the transmission housing GG or a housing cover that is affixed on the transmission housing.

A person skilled in the art will modify this example of spatial arrangement of the two brakes A, B, as needed, without particular inventive effort. Brake A can be arranged, at least in part, radially above the first planetary gearset RS1; and brake B can be arranged, at least in part, radially above the fourth planetary gearset RS4. In yet another embodiment, the two brakes A, B can be arranged on the side of the first planetary gearset RS1 that faces away from the fourth planetary gearset RS4, radially one above the other, axially adjacent to the first planetary gearset RS1, whereby brake B, for example, is then arranged on a larger diameter than brake A.

As can also be seen in FIG. 1, at least the disc sets of the clutches C and E are arranged from a spatial point of view between the second and fourth planetary gearsets RS2, RS4, while at least the disc set of the clutch D is arranged from a spatial point of view within an area located radially above the second planetary gearset RS2. The servo units of the three clutches C, D, E that are required to activate these disc sets are not shown in detail in FIG. 1 for the purpose of simplification.

In the exemplary embodiment shown here, the clutches C and E are arranged at least to a large extent axially side by side. The clutch C is thereby arranged axially adjacent the fourth planetary gearset RS4. An external disc carrier of the clutch C is connected in a rotationally fixed manner to the carrier ST4 of the fourth planetary gearset RS4 on the side of the disc set of the clutch C facing the fourth planetary gearset RS4 and with the input shaft AN and can, therefore, be identified as a section of shaft 1 of the transmission. An internal disc carrier of the clutch C is connected in a rotationally fixed manner to the sun gears SO2, SO3 of the second and third planetary gearsets RS2, RS3 and can, therefore, be identified as a section of shaft 5 of the transmission. The servo unit, required for activating the disc set of the clutch C, can be arranged inside the cylindrical chamber that is formed by the external disc carrier of the clutch C, can be mounted in an axially displaceable manner on this external disc carrier and then rotates constantly with the rotational speed of shaft 1 or the input shaft AN. However, the servo unit of the clutch C can be mounted in an axially displaceable manner on the internal disc carrier of the clutch C and rotates constantly with the rotational speed of shaft 5. In order to compensate for the rotational pressure of the rotating pressure chamber of this servo unit, the clutch C can have a known dynamic pressure compensation.

The clutch E, which in an engaged or shifted state locks the second planetary gearset RS2, is arranged axially directly adjacent to the second planetary gearset RS2. An external disc carrier of the clutch E is connected on its side facing the second planetary gearset RS in a rotationally fixed manner to its carrier ST2, and on its side facing the fourth planetary gearset RS4, it is connected in a rotationally fixed manner to its ring gear HO4. The external disc carrier of the clutch E, therefore, can be identified as a section of shaft 7 of the transmission, the length of shaft 7 of the transmission completely overlaps the clutch C in an axial direction. An internal disc carrier of the clutch E—like the internal disc carrier of the clutch C—is also connected in a rotationally fixed manner to the sun gears SO2, SO3 of the second and third planetary gearsets RS2, RS3. The person skilled in the art can clearly see that this enables several possibilities for producing assemblies that are, with regard to the production, advantageous from a technical standpoint, which will be explained in more detail below. Returning to the exemplary embodiment shown in FIG. 1 the servo unit necessary for activating the disc set of the clutch E can be mounted in an axially displaceable manner on the internal disc carrier of the clutch E and to rotate constantly at the rotational speed of shaft 5 or the servo necessary for activating the disc set of the clutch E can be mounted in an axially displaceable manner on the external disc set of the clutch E to rotate constantly at the rotational speed of shaft 7. In order to offset the rotational pressure of the pressure chamber of the servo of the clutch E, dynamic pressure compensation can be provided in the known manner.

As already mentioned, it can be provided in different constructive embodiments that a common disc set is provided for the clutches C and E, which is connected to the sun gears SO2, SO3 of the second and third planetary gearsets RS2, RS3. A common disc carrier of this kind can be configured as a common internal disc carrier for the clutches C, E, in order to advantageously accommodate disc sets of the two clutches C, E on an at least similar diameter, which are arranged axially adjacent, wherein the disc set of the clutch E is arranged closer to the second planetary gearset RS2 than the disc set of the clutch C. This kind of common disc carrier can also be configured as an internal disc carrier for the clutch E and as an external disc carrier for the clutch C, in order to accommodate disc sets that are arranged at least partially radially one above the other. The disc set of the clutch E is then arranged over a larger diameter than the disc set of the clutch C. In both of the cited cases, it is advantageous if both the servo unit of the clutch C and the servo unit of the clutch E are deposed in an axially displaceable manner on the cited common internal disc carrier, where dynamic pressure compensation is provided for both clutches C, E in order to compensate for the rotational pressure that results from the rotation of the pressure chambers of both servo units at the rotational speed of shaft 5.

Returning to the example of a spatial arrangement of the clutch D, shown in FIG. 1, where the clutch D is arranged at least partially within an area located radially above the second planetary gearset RS2; an external disc carrier of the clutch D is connected in a rotationally fixed manner to its ring gear HO3 on the side of the clutch facing the third planetary gearset RS3 and, on the side facing the second planetary gearset RS2, it is connected in a rotationally fixed manner to the carrier ST1 of the first planetary gearset RS1 and, therefore, can be identified as a section of shaft 6 of the transmission. An internal disc carrier of the clutch D is connected in a rotationally fixed manner to the ring gear HO2 of the second planetary gearset RS2 and forms a section of shaft 8 of the transmission. In another exemplary embodiment of the transmission according to the invention that deviates from the exemplary embodiment shown in FIG. 1, the disc set of the clutch D can also be arranged within an area located axially between the second and third planetary gearsets RS2, RS3. The servo unit necessary for activating the disc set of the clutch D can be arranged inside the cylindrical chamber formed by the external disc carrier of the clutch D and can be mounted, in an axially displaceable manner, on this external disc carrier of the clutch D to rotate constantly at the rotational speed of shaft 6. A pressure chamber of this servo unit can be arranged from a spatial point of view within an area located axially between the second and third planetary gearsets RS2, RS3 or within an area located axially between the first and fourth planetary gearsets RS1, RS4. It is also possible, however, to provide the servo of the clutch D in an axially displaceable manner on the internal disc carrier of the clutch D to constantly rotate with the rotational speed of shaft 8. In order to compensate for the rotational pressure of the rotating pressure chamber of this servo unit, the clutch D can have a known dynamic pressure compensation.

According to the gearset diagram corresponding to the sequence of "RS1-RS4-RS2-RS3" of the four planetary gearsets RS1, RS2, RS3, RS4, and corresponding to the arrangement of the three clutches C, D, E within an area located axially between the fourth and third planetary gearset RS4, RS3, the length of shaft 6 of the transmission completely overlaps in axial direction the fourth planetary gearset RS4, the two clutches C, E, and the second planetary gearset RS2. Shaft 6 thereby radially encloses shaft 7 and shaft 8, and a section of shaft 2.

It is expressly pointed out that the arrangement of the five shifting elements A, B, C, D, E, described above, is to be considered as an example only. If needed, the person skilled in the art will modify this example of spatial arrangement of the five shifting elements A, B, C, D, E. Numerous proposals for this can be found in the patent application of the generic kind DE 10 2005 002 337.1.

Figure 2:
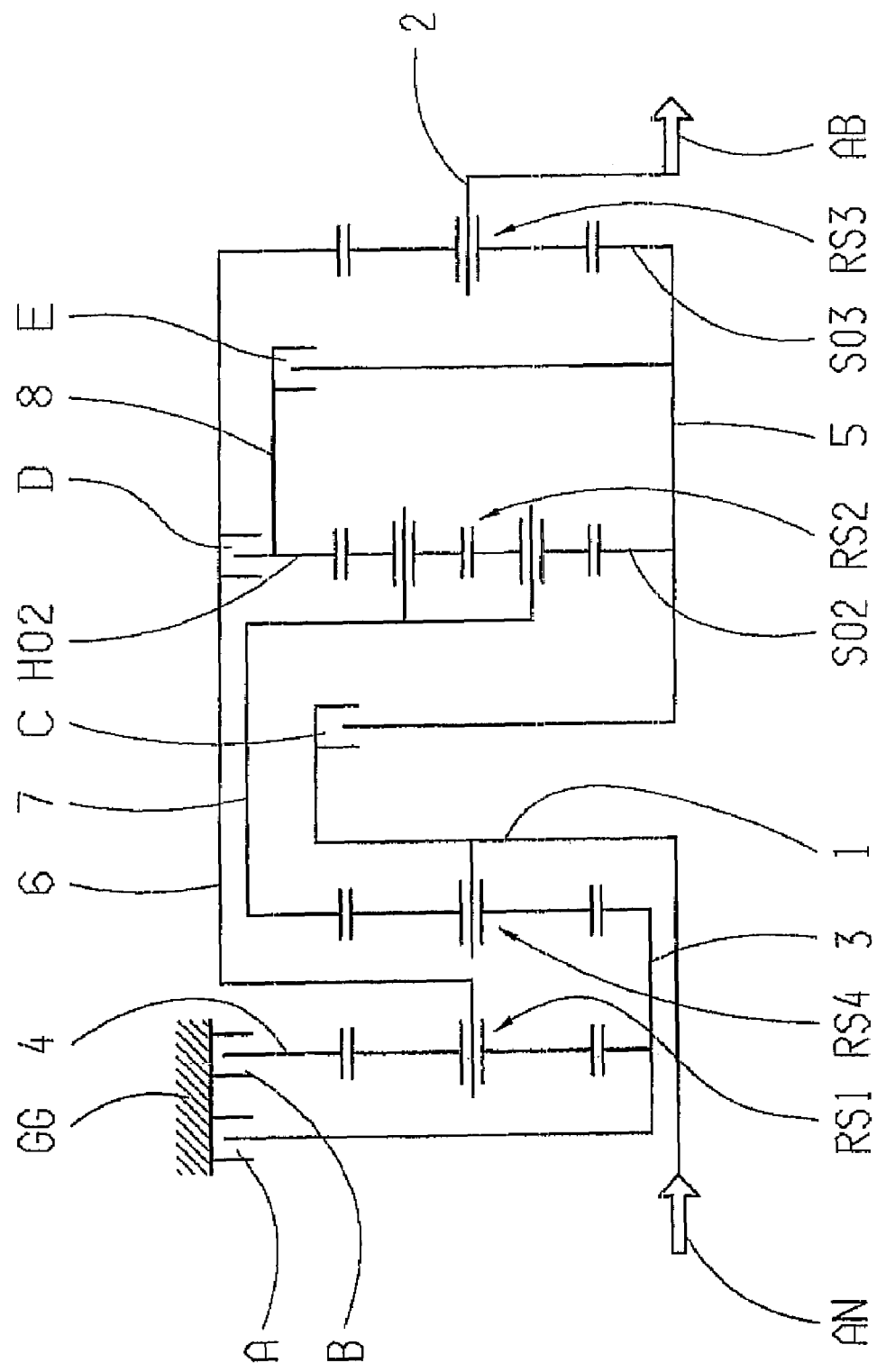
FIG. 2 shows a schematic representation of a second exemplary embodiment of multi-speed transmission according to the invention, based on the transmission diagram according to FIG. 1.

Based on the consideration that the clutch E, as fifth shifting element of the transmission, locks the second planetary gearset RS2 in shifted or engaged state, two other possibilities are shown, two exemplary embodiments of a multi-speed transmission for locking the cited second planetary gearset RS2 by way of the cited clutch E is provided for both clutches C, E for dynamic pressure compensation. FIG. 2 illustrates a second exemplary embodiment and FIG. 3, a third exemplary embodiment for a multi-speed transmission, again in simplified, schematic presentation, both based on the first exemplary embodiment of an inventive transmission explained in detail above in FIG. 1.

It can be easily seen in FIG. 2 that the only difference in the transmission kinematics of the second exemplary embodiment shown here of a multi-speed transmission compared to FIG. 1, is that the clutch E is now arranged within the power flow between shaft 5 and shaft 8. In shifted or engaged state, the clutch E, therefore, now connects sun gear SO2 and ring gear HO2 of the planetary gearset RS to each other.

It can also be seen in FIG. 2, that the most important difference in the shifting element arrangement inside the housing GG in the second exemplary embodiment, shown here of a multi-speed transmission compared to FIG. 1, is that the clutch E is now arranged, from a spatial point of view, within an area located axially between the second and third planetary gearsets RS2, RS3. In this way, the clutch E is now axially arranged directly adjacent to both the second and the third planetary gearsets RS2, RS2. The external disc carrier of the clutch E is now connected in a rotationally fixed manner on the side of the disc carrier that faces the second planetary gearset RS2 to the ring gear HO2 of the planetary gearset and, from now on, forms a section of shaft 8 of the transmission. The internal disc carrier of the clutch E forms a section of shaft 5 of the transmission and is connected in a rotationally fixed manner to the sun gears SO2, SO3 of the second and third planetary gearsets RS2, RS3, and in this way, also to the internal disc carrier of the clutch C. A servo unit—not depicted in FIG. 2 for the purpose of simplification—can be arranged inside the cylindrical chamber that is formed by the external disc carrier of the clutch E, mounted in an axially displaceable manner on the cited external disc carrier and constantly rotates at the rotational speed of shaft 8. The servo unit of the clutch E can also be mounted in an axially displaceable manner on the internal disc carrier of the clutch E and constantly rotates at the rotational speed of shaft 5.

In a manner that is advantageous from the standpoint of the manufacturing technology, a common disc carrier, which forms a section of shaft 8 of the transmission, can be provided for the clutches D and E. A common disc carrier of this kind is advantageously configured as an internal disc carrier for the clutch D and as an external disc carrier for the clutch E, wherein the disc set of the clutch D is arranged over a larger diameter than the disc set of the clutch E, whereby the disc sets of these two clutches D, E can be optionally arranged from a spatial point of view axially side-by-side or radially one above the other, and wherein both the servo unit of the clutch D and the servo unit of the clutch E are mounted in an axially displaceable manner on the cited common internal disc carrier, and dynamic pressure compensation is provided for both cited servo units. A common disc carrier of this type for the clutches D, E can be configured as one piece, together with the ring gear HO2 of the second planetary gearset RS2 or only appropriately connected in a rotationally fixed manner to the cited ring gear HO2 when the transmission is assembled.

In other respects, in the exemplary embodiment of a transmission, shown in FIG. 2, the spatial arrangement and constructive design of the shifting elements of FIG. 1 are reproduced so that this description does not have to be repeated here.

Figure 3:
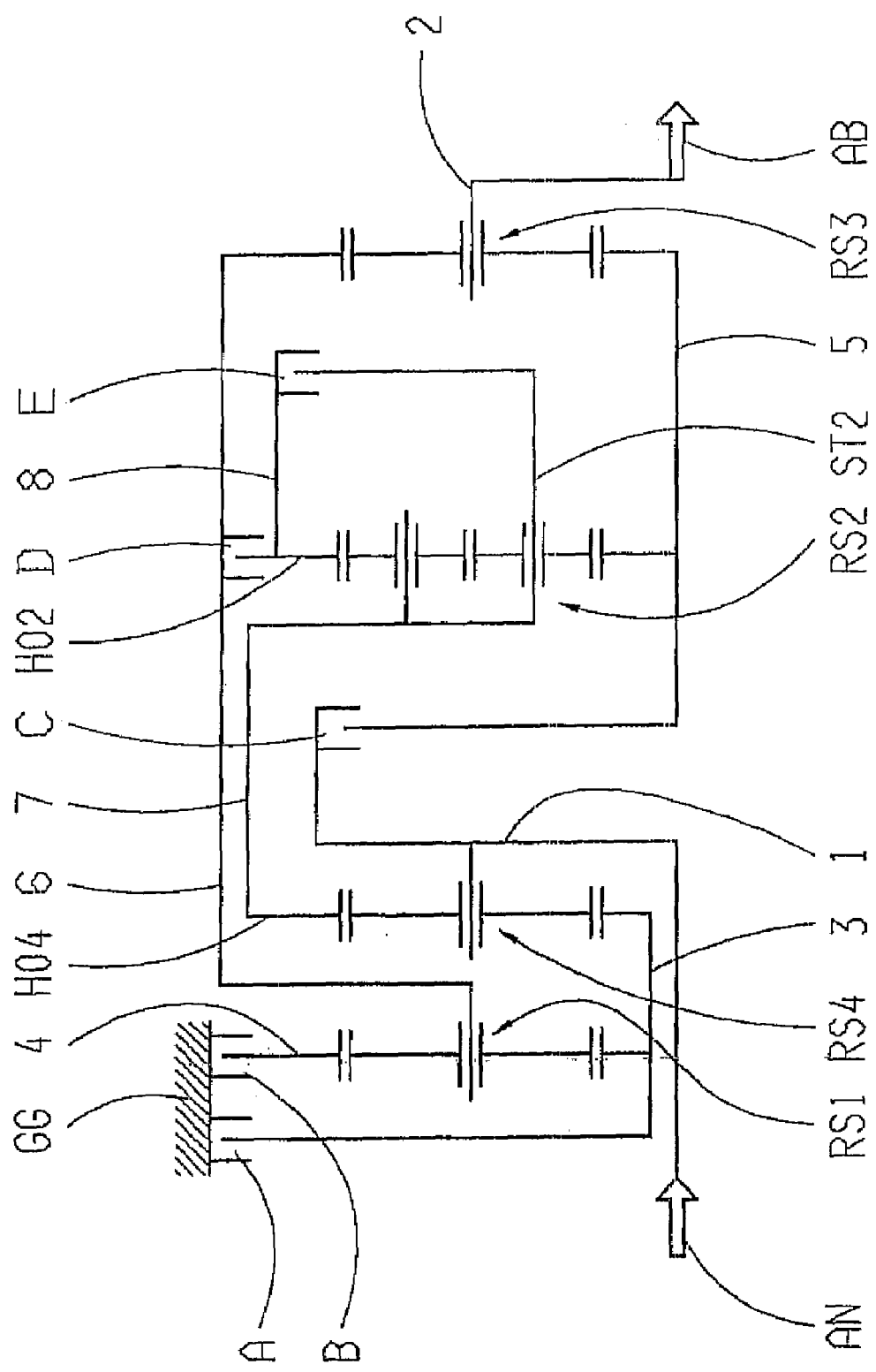
FIG. 3 shows a schematic representation of a third example of a multi-speed transmission according to the invention, based on the transmission diagram according to FIG. 1.

It can easily be seen in FIG. 3 that the only difference in transmission kinematics in the third exemplary embodiment of an inventive multi-speed transmission, shown here compared to FIG. 1, consists in the clutch E now being arranged in the power flow between shaft 7 and shaft 8. In shifted or engaged state, the clutch E now, therefore, connects the carrier ST2 and the ring gear HO2 of the planetary gearset RS2 to each other.

It can also be seen in FIG. 3 that the most important difference, with reference to the shifting element arrangement inside the transmission housing GG in the second exemplary embodiment of an inventive multi-speed transmission shown here compared to FIG. 1, is that the clutch E is now arranged from a spatial point of view within an area axially between the second and third planetary gearsets RS2, RS3. In this way, the clutch E is now axially arranged directly adjacent to the third planetary gearsets RS2, RS3. The external disc carrier of the clutch E is now connected in a rotationally fixed manner on its side facing the second planetary gearset RS2 to the ring gear HO2 of the planetary gearset and, in this way, now forms a section of shaft 8 of the transmission. The internal disc carrier of the clutch E forms a section of shaft 7 of the transmission and is, on one hand, connected in a rotationally fixed manner to the carrier ST2 of the second planetary gearset RS2 and, via its carrier ST2, also to the ring gear HO4 of the fourth planetary gearset RS4. A servo unit of the clutch E, which is intended for activation of the disc set of the clutch 3—not shown in detail in FIG. 3 for the purpose of simplification—can be arranged inside the cylindrical chamber, which is formed by the external disc carrier of the clutch E, mounted in an axially displaceable manner on the cited external disc carrier and rotates constantly at the rotational speed of shaft 8. The servo unit of the clutch E, however, can be mounted in an axially displaceable manner on the internal disc carrier of the clutch E and rotates constantly at the rotational speed of shaft 7.

The person skilled in the art can clearly see that, in a similar way as in FIG. 2, a common disc carrier can be provided for the clutches D, E in the exemplary embodiment shown in FIG. 3. The explanations concerning the exemplary embodiment shown in FIG. 2 can be transferable, entirely or at least in the same sense, to the exemplary embodiment of a transmission according to the invention shown in FIG. 3.

It is also obvious to the person skilled in the art that in a constructive embodiment of the transmission deviating from FIG. 3, the clutch E, which is arranged within the power flow between shafts 7 and 8, could be arranged from the spatial point of view on the side of the second planetary gearset RS2 that faces away from the third planetary gearset RS3, i.e., within an area located axially between the second planetary gearset RS2 and the fourth planetary gearset RS4 and therein advantageously axially adjacent to the second planetary gearset RS2.

In the third exemplary embodiment, shown in FIG. 3, the spatial arrangement and constructive embodiment of the shifting elements corresponds to that of FIG. 1 such that it is not necessary to describe them again at this point.

FIG. 4 illustrates a shift pattern, which can be provided for the inventive multi-speed transmission, according to the FIGS. 1, 2 and 3. In each gear, three shifting elements are engaged and two shifting elements are disengaged. In addition to the gearing logic, examples of values for the respective transmission ratios i in individual gear ratios can be obtained, along with the progressive ratios (p determined from them. The specified ratios are obtained from the (typical) stationary transmission ratios i of the four planetary gearsets RS1 RS2, RS3, RS4 of minus 2.00, plus 2.00 minus 3.70, and minus 2.00. In addition, it can be seen from the shift pattern that, double shifts or range shifts can be prevented with sequential shifting, because two adjacent gear ratios in the shifting logic use two shifting elements in common. The sixth gear is configured as a direct gear.

The first forward gear is realized by engaging the brakes A and B and the clutch C; the second forward gear is realized by engaging the brakes A and B and the clutch E; the third forward gear is realized by engaging the brake B and the clutches C and E; the fourth forward gear is realized by engaging the brake B and the clutches D and E; the fifth forward gear is realized by engaging the brake B and the clutches C and D; the sixth forward gear is realized by engaging the clutches C, D and E; the seventh forward gear is realized by engaging the brake A and the clutches C and D, as well as the eighth forward gear is realized by engaging the brake A and the clutches D and E. As can also be seen from the shift pattern, the reverse gear is obtained by engaging the brakes A and B and the clutch D.

According to the invention, it is possible to initiate driving the motor vehicle with a shifting element integrated into the transmission. For this purpose, a shifting element that is used in both the first forward gear and in the reverse gear is particularly suitable, in this case preferably the brake A or the brake B. Advantageously, both of these brakes A, B are also required in the second forward gear. If the brake B is used as the starting element integrated into the transmission, it is even possible to start in the first five forward gears and the reverse gear. As can be seen from the shift pattern, the clutch C can also be used when initiating drive in a forward direction and the clutch D can be used as an internal transmission starting element for initiating drive in a reverse direction.

Figure 5:
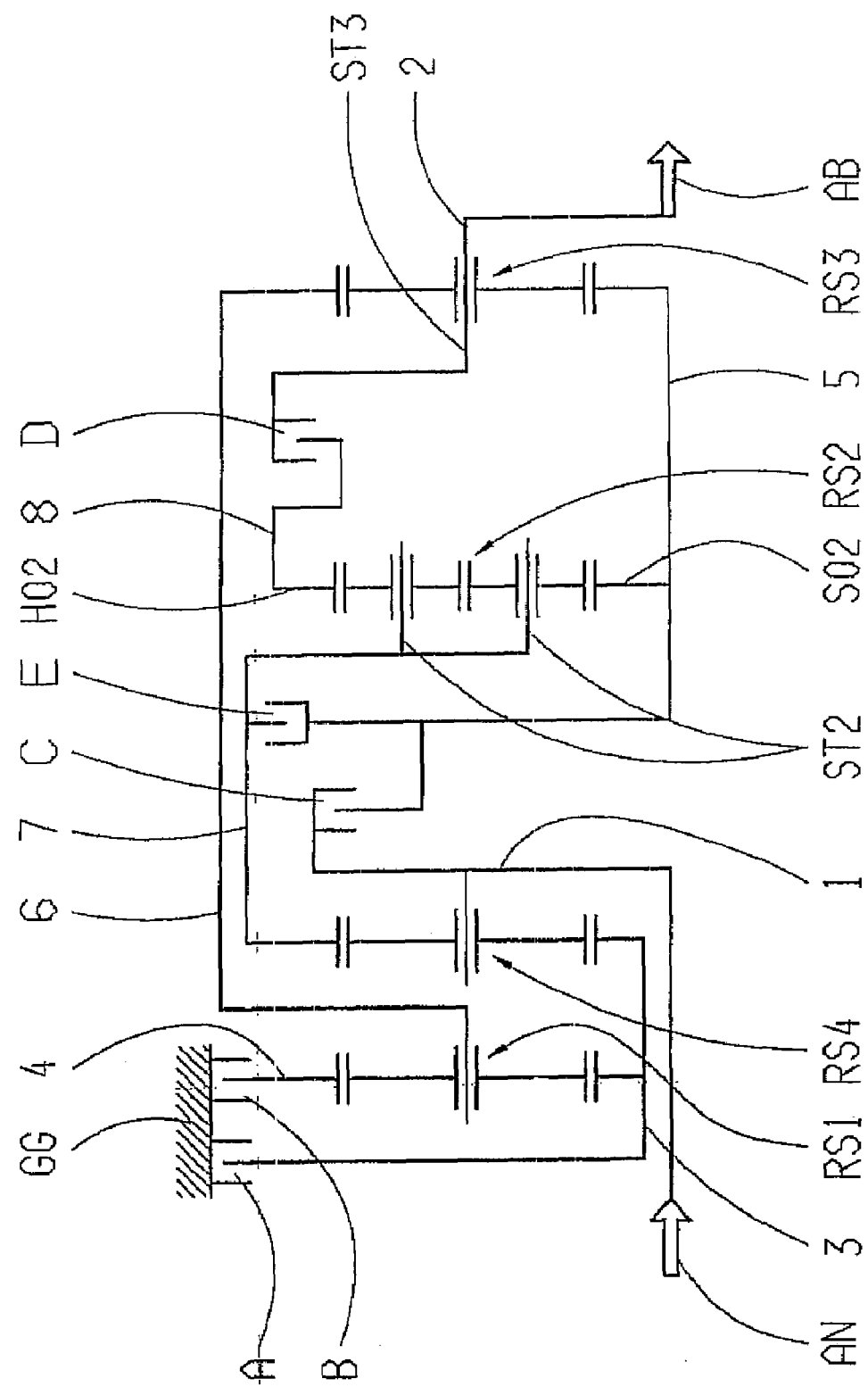
FIG. 5 shows a schematic representation of a fourth example of multi-speed transmission according to the invention, based on the transmission diagram according to FIG. 1.

FIG. 5 shows a fourth exemplary embodiment of a multi-speed transmission based on the first exemplary embodiment of a transmission, explained in detail above, on the basis of FIG. 1. It can be clearly seen in FIG. 5 that the only difference, in relation to the transmission kinematics of the fourth exemplary embodiment illustrated here, compared to FIG. 1, consists of the clutch D, as the fourth shifting element of the transmission now being arranged in the power flow between shaft 2 and shaft 8 of the transmission. In a shifted or engaged state, the clutch D now connects the ring gear of the planetary gearset RS2 to the carrier of the third planetary gearset RS3 and, in this way, via the carrier ST3 to the output shaft AB of the transmission.

It can also be clearly seen in FIG. 5 that the spatial arrangement of the components of the transmission relative to each other within the transmission housing, except for the details concerning clutch D, have been unchanged from that of FIG. 1. The following description, therefore, can be limited to these diverging details. As can be seen in FIG. 5, the clutch D is now arranged from a spatial point of view within an area located axially between the second planetary gearset RS2 and the third planetary gearset RS3. An external disc carrier of the clutch D therein forms a section of shaft 2 of the transmission and is connected to this carrier ST3 on its side that faces the third planetary gearset RS3. An internal disc carrier of the clutch D forms a section of shaft 8 of the transmission and is connected to the ring gear HO2 of the planetary gearset RS2 on its side facing the planetary gearset. A servo unit of the clutch D for activation of its disc set—not shown in detail in FIG. 5 for the purpose of simplification—can be arranged inside the cylindrical chamber that is formed by the external disc carrier of the clutch D; can be mounted in an axially displaceable manner on the external carrier and then rotate constantly at the rotational speed of shaft 2 or the output shaft AB. However, the servo unit of the clutch D can also be mounted in an axially displaceable manner on the internal disc carrier of the clutch D and rotates constantly at the rotational speed of shaft 8. In the known manner, the servo unit of the clutch D can also have dynamic pressure compensation.

Figure 6:
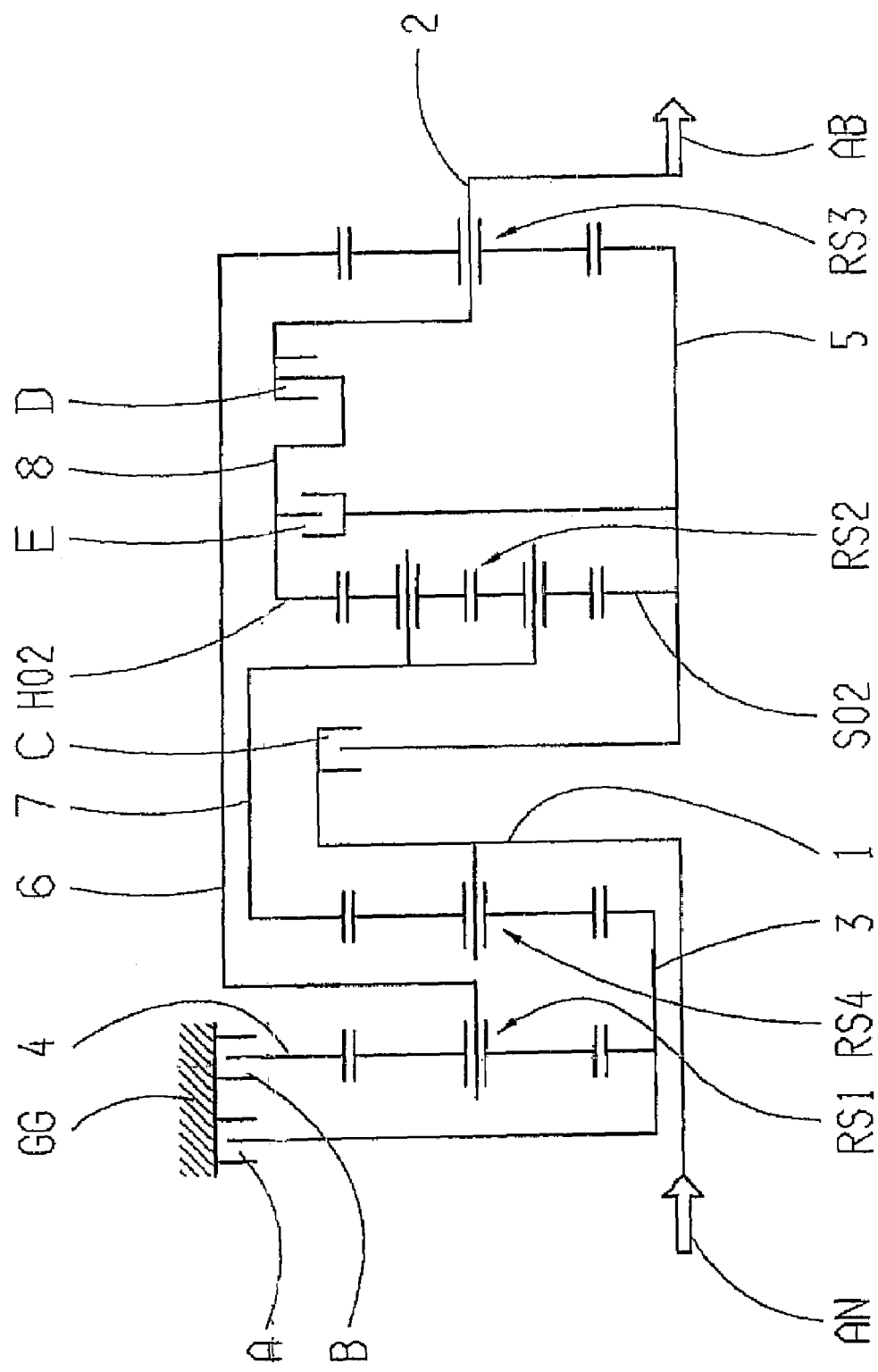
FIG. 6 shows a schematic representation of a fifth example of a multi-speed transmission according to the invention, based on the transmission diagram according to FIG. 1.
Figure 7:
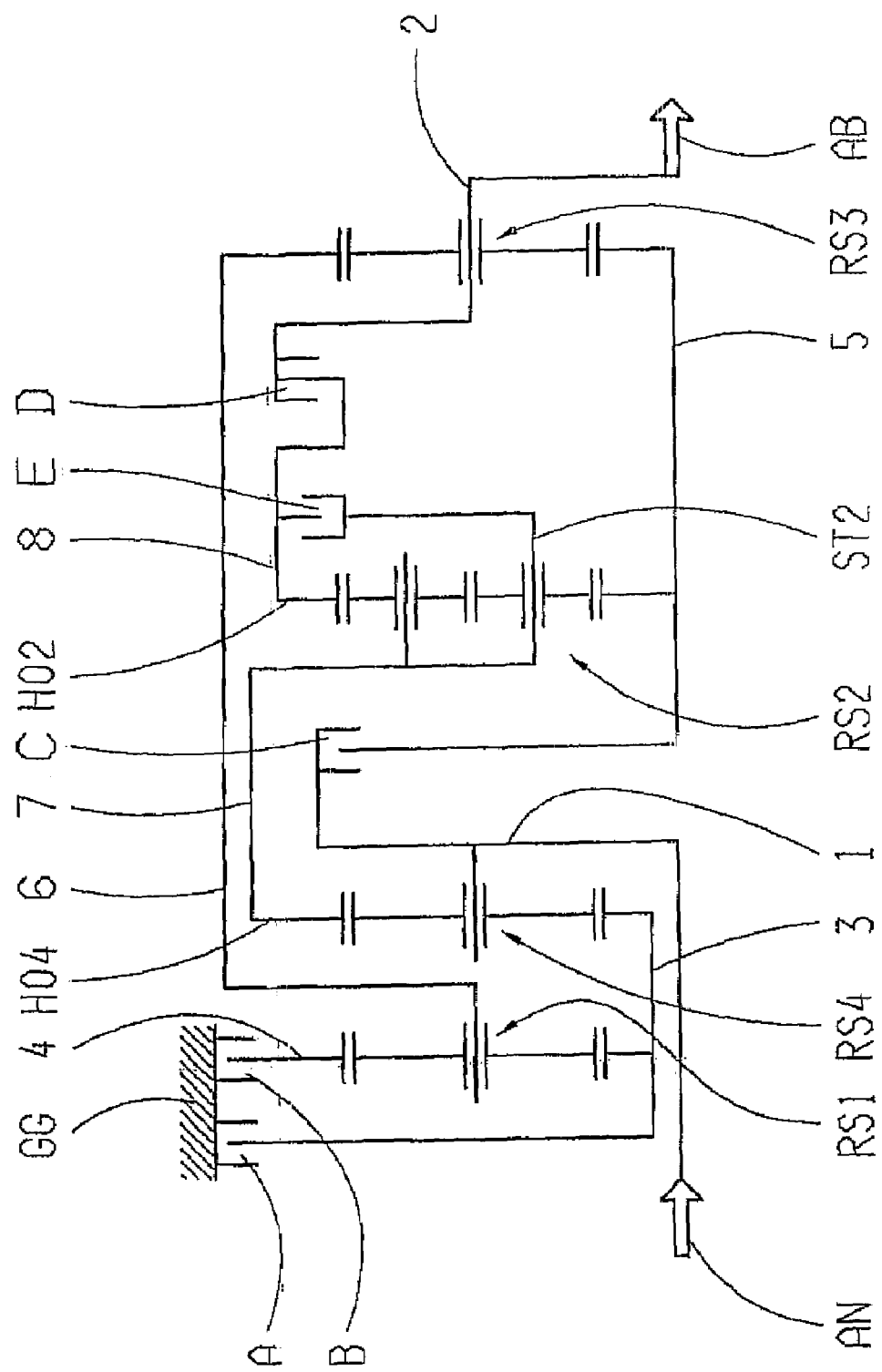
FIG. 7 shows a schematic representation of a sixth example of a multi-speed transmission according to the invention, based on the transmission diagram according to FIG. 5.

Based on the consideration that the clutch E, as fifth shifting element, locks the second planetary gearset RS2 in shifted or engaged state, the following two exemplary embodiments of a multi-speed transmission illustrate two other possibilities for locking the second planetary gearset RS2 by way of said clutch E. FIG. 6 shows a fifth exemplary embodiment, and FIG. 7 shows a sixth exemplary embodiment for a multi-speed transmission according to the invention, again in simplified schematic presentation, both based on the fourth exemplary embodiment of a transmission explained above with reference to FIG. 5.

It can be clearly seen in FIG. 6 that the only difference, with regard to transmission kinematics in the fifth exemplary embodiment of a multi-speed transmission illustrated here in comparison with FIG. 5, consists in that clutch E is now arranged within the power flow between shaft 5 and shaft 8. In a shifted or engaged state, the clutch E now connects the sun gear SO2 and the ring gear HO2 of the planetary gearset RS2 to each other.

In FIG. 6, it can also be seen that the most important difference pertaining to the shifting element arrangement within the transmission housing GG in the fifth exemplary embodiment of a multi-speed transmission, shown here in comparison with FIG. 5, consists in that the clutch E is now arranged from a spatial point of view within an area located axially between the second and third planetary gearsets RS2, RS3, thereby axially directly adjacent to the second planetary gearset RS2. As an example, the clutches D and E are arranged at least to a great extent axially side-by-side, wherein the clutch D is arranged closer to the third planetary gearset RS3 than the clutch E. The external disc carrier of the clutch E now forms a section of shaft 8 of the transmission and is connected to the ring gear HO2 of the second planetary gearset RS2 on its side facing the planetary gearset and is connected to the internal disc carrier of the clutch D at its side that faces away from the second planetary gearset RS2. The internal disc carrier of the clutch E forms a section of shaft 5 of the transmission and is connected in a rotationally fixed manner to the sun gears SO2, SO3 of the second and third planetary gearsets RS2, RS3 and therein also to the internal disc carrier of the clutch C. A servo unit of the clutch E (not shown in more detail in FIG. 6), can be mounted within an axially displaceable manner on the internal disc carrier of the clutch E to constantly rotate at the rotational speed of shaft 5. However, the servo of the clutch E can also be arranged inside the cylindrical chamber formed by the external disc carrier of the clutch E and can be mounted in an axially displaceable manner on this external disc carrier to constantly rotate then constantly at the rotational speed of shaft 8. The servo unit of the clutch E can then have known dynamic pressure compensation.

In a manner that is advantageous for production technology, a common disc carrier, which forms a section of shaft 8 of the transmission, can be provided for the clutches D and E. A common disc carrier of this kind can be executed as an external disc carrier for the clutch E and for the clutch D, as an internal disc carrier or for both clutches D, E as an external disc carrier, in both cases to receive disc sets that are arranged axially side-by-side. However, this kind of common disc carrier can also be configured as an external disc carrier for the clutch E, and as an internal disc carrier for the clutch D in order to accommodate disc sets that are arranged radially one above the other, wherein in this case, the disc set of the clutch D is arranged radially above the disc set of the clutch E.

It can be clearly seen in FIG. 7 that the only difference, with regard to the transmission kinematics in the sixth exemplary embodiment of a multi-speed transmission illustrated herein in comparison with FIG. 5 and FIG. 6, consists in that the clutch E is now arranged within the power flow between shaft 7 and shaft 8. In shifted or engaged state, the clutch E, therefore, now connects the carrier ST2 and the ring gear HO2 of the planetary gearset RS2 to each other.

It can also be seen in FIG. 7 that the spatial arrangement of the shifting elements within the transmission housing GG, relative to the four planetary gearsets RS1, RS4, RS2, RS3, shown herein in the sixth exemplary embodiment of a multi-speed transmission, was largely taken over from FIG. 6. The most important difference with regard to FIG. 6 consists in that the internal disc carrier of the clutch E now forms a section of shaft 7 of the transmission and is connected, on its side facing the second planetary gearset RS2, to the carrier ST2 of the planetary gearset and is connected to the ring gear HO4 of the fourth planetary gearset RS4, via its carrier ST2. In this respect, it is possible to dispense here with another detailed description of the spatial arrangement and constructive design of individual transmission components.

FIG. 8 finally illustrates a shift pattern, which could be provided for the multi-speed transmission, according to the invention of FIGS. 5, 6, and 7. In each gear, three shifting elements are engaged and two shifting elements are disengaged. In addition to the gearing logic, examples of values for the respective transmission ratios i in individual gear ratios can be obtained, along with the progressive ratios φ determined from them. The specified ratios are obtained from the (typical) stationary transmission ratios of the four planetary gearsets RS1, RS2, RS3, RS4 of minus 2.00, plus 1.60, minus 3.70 and minus 2.00. In addition, it can be seen from the shift pattern that double shifts or group shifts can be prevented with sequential shifting, because two adjacent gear ratios in the shifting logic use two shifting elements in common. It can be clearly seen in FIG. 8, that the gearing logic is identical to that in FIG. 4, which is why it is not necessary to describe it again at this time. According to the changed kinematic connection to the clutch D, compared to the gearset schemes, illustrated in FIGS. 1, 2, and 3, and the slightly changed stationary transmission ratios of the second planetary gearset RS2 that are reasonable within this context, slightly different ratios i and progressive ratios φ are obtained for the gearset schemes according to FIGS. 5, 6 and 7 in comparison with FIG. 4.

The following also applies to all of the previously explained or described exemplary embodiments of a multi-speed transmission according to the invention:

Different gear transitions can be produced, even with the same gear gearbox diagram, depending on the stationary gearing multiplication, which makes possible having variations specific to the use or the vehicle.

Figure 14:
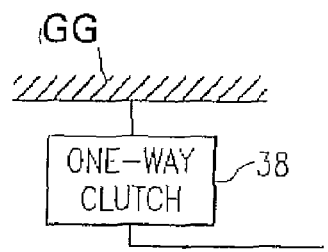
FIG. 14 is a diagrammatic view of a one-way clutch for a multi-speed transmission.

It is also possible, as shown in FIG. 14, to provide additional one-way clutches 38 at any suitable position in the multi-speed transmission between a shaft and the housing or in order to connect two shafts, if necessary.

Figure 9:
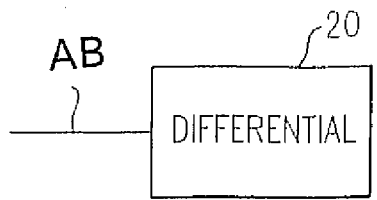
FIG. 9 is a diagrammatic view of a multi-speed transmission having a differential.

An axle differential and/or a distributor differential 20 can be arranged on either the input side or the output side, as shown in FIG. 9.

Figure 10:
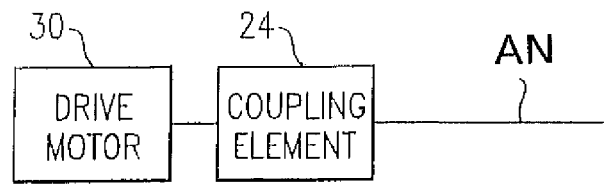
FIG. 10 is a diagrammatic view of a multi-speed transmission with a coupling element and a drive motor.
Figure 11:
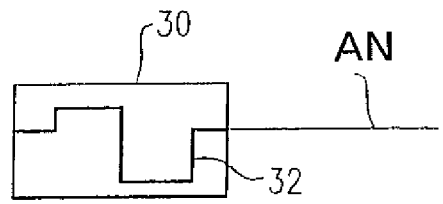
FIG. 11 is a diagrammatic view of a multi-speed transmission with a crankshaft of a drive motor fixed to an input shaft of the multi-speed transmission.
Figure 18:
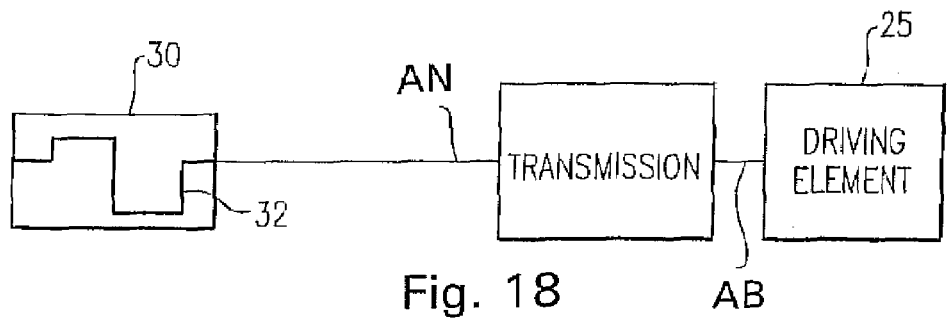
FIG. 18 is a diagrammatic view of a multi-speed transmission with a crankshaft of a drive motor fixed to the input shaft of the multi-speed transmission and the coupling element located behind the multi-speed transmission.

In an advantageous further development, as shown in FIG. 10, the input shaft AN can be separated, if needed, by a coupling element 24 from a propulsion drive motor 30, wherein a hydrodynamic converter, a hydraulic clutch, a dry starting clutch, a wet starting clutch, a magnetic particle clutch or a centrifugal clutch can be used as such a coupling element 24. It is also possible, as shown in FIG. 18, to arrange a driving element 25 of this kind within the power flow behind the transmission whereby, in this case, the input shaft AN is permanently connected to the crankshaft 32 of the drive motor 30 and shown in FIG. 11.

Figure 12:
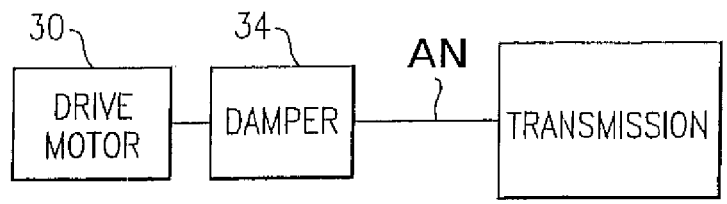
FIG. 12 is a diagrammatic view of a multi-speed transmission having a drive motor communicating with a damper.

In addition, the multi-speed transmission, as shown in FIG. 12, provides the possibility of arranging a torsional vibration damper between the drive motor 30 and the transmission.

Figure 13:
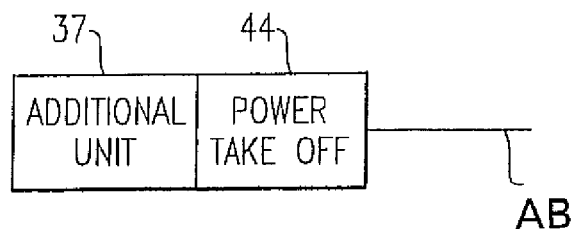
FIG. 13 is a diagrammatic view of a multi-speed transmission with a power take-off for driving an additional unit.
Figure 16:
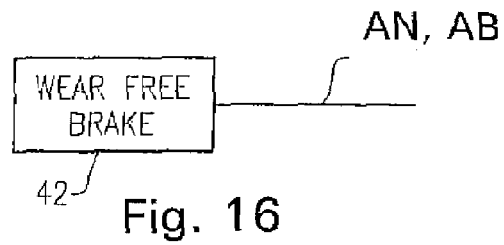
FIG. 16 is a diagrammatic view of wear free brake for a multi-speed transmission.
Figure 17:
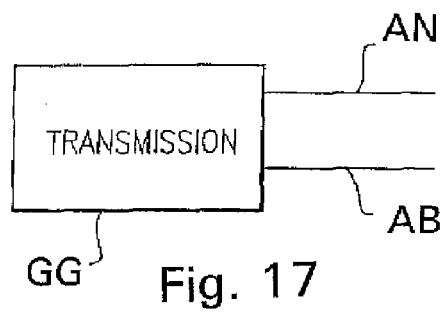
FIG. 17 is a diagrammatic view of an embodiment with the input and the output provided on the same side of the multi-speed transmission housing.

Within the scope of an additional embodiment of the invention, as shown in FIG. 16, a wear-free brake 42, such as a hydraulic or electric retarder, or the like can be arranged on the input shaft AN or the output shaft AB, which is particularly important for use in commercial vehicles. In addition, as shown in FIG. 13, an power takeoff can be provided on each shaft, preferably on the input shaft AN or the output shaft AB, in order to drive additional units 36 on each shaft. Additionally, as shown in FIG. 17, the input and the output are provided on the same side of the housing GG.

The shifting elements used can be configured as power-shifting clutches or power-shifting brakes. In particular, non-positive clutches or non-positive brakes, such as disc clutches, band brakes and/or conical clutches, can be used. In addition, form fit brakes and/or form fit clutches, such as synchronizations or claw clutches, can be used as shifting elements.

Figure 15:
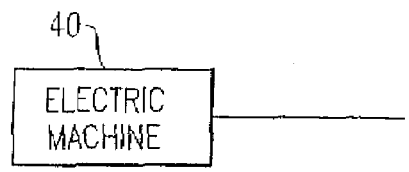
FIG. 15 is a diagrammatic view of an electric machine for a multi-speed transmission.

A further advantage of the multi-speed transmission, described herein and shown in FIG. 15, is that an electric machine 40 can also be affixed to each shaft as a generator and/or auxiliary main engine.

Any constructive design, in particular every spatial arrangement of the planetary sets and the shifting elements per se, as well as with respect to each other, and insofar as technically practical, can be included under the scope of the protection of the claims, without influencing the function of the transmission as specified in the claims, even if these designs are not explicitly presented in the Figures or in the specification.

REFERENCE NUMERALS 1 first shaft
2 second shaft
3 third shaft
4 fourth shaft
5 fifth shaft
6 sixth shaft
7 seventh shaft
8 eighth shaft
A first shifting element, first brake
B second shifting element, second brake
C third shifting element, first clutch
D fourth shifting element, second clutch
E fifth shifting element, third clutch
AB output shaft
AN input shaft
GG housing
RS1 first planetary gearset
HO1 ring gear of the first planetary gearset
SO1 sun gear of the first planetary gearset
ST1 carrier of the first planetary gearset
PL1 planetary gears of the first planetary gearset
RS2 second planetary gearset
HO2 ring gear of the second planetary gearset
SO2 sun gear of the second planetary gearset
ST2 carrier of the second planetary gearset
PL2a outer planetary gears of the second planetary gearset
PL2i inner planetary gears of the second planetary gearset
RS3 third planetary gearset HO3 ring gear of the third planetary gearset
SO3 sun gear of the third planetary gearset
ST3 carrier of the third planetary gearset
PL3 planetary gears of the third planetary gearset
RS4 fourth planetary gearset
HO4 ring gear of the fourth planetary gearset
SO4 sun gear of the fourth planetary gearset
ST4 carrier of the fourth planetary gearset
PL4 planetary gears of the fourth planetary gearset
i transmission ratio
ϕ progressive ratios

The invention claimed is:

1. A multi-speed automatic transmission of a planetary design for a vehicle, the transmission comprising:
an input shaft (AN) and an output shaft (AB);
first, second, third, and fourth planetary gearsets (P1, P2, P3, P4), and each of the first, the second, the third, and the fourth planetary gearsets (P1, P2, P31 P4) comprising a sun gear, a carrier and a ring gear;
at least first, second, third, fourth, fifth, sixth, seventh and eighth rotatable shafts (1, 2, 3, 4, 5, 6, 7, 8) and first, second, third, fourth and fifth shifting elements (A, B, C, D, F), whose selective engagement creates different gear ratios between the input shaft (AN) and the output shaft (AB) so that at least eight forward gears and one reverse gear can be implemented;
wherein the carrier (ST4) of the fourth planetary gearset (RS4) is coupled to the input shaft (AN) and forms the first shaft (1);
the carrier (ST3) of the third planetary gearset (RS3) is coupled to the output shaft (AB) and forms the second shaft (2);
the sun gear (SO1) of the first planetary gearset (RS1) is coupled to the sun gear (S04) of the fourth planetary gearset (RS4) and forms the third shaft (3);
the ring gear (HO1) of the first planetary gearset (RS1) forms the fourth shaft (4);
the sun gear (SO2) of the second planetary gearset (RS2) is coupled to the sun gear (S03) of the third planetary gearset (RS3) and forms the fifth shaft (5);
the carrier (ST1) of the first planetary gearset (RS1) is coupled to the ring gear (H03) of the third planetary gearset (RS3) and forms the sixth shaft (6);
the carrier (ST2) of the second planetary gearset (RS2) is coupled to the ring gear (HO4) of the fourth planetary gearset (RS4) and forms the seventh shaft (7);
the ring gear (H02) of the second planetary gearset (RS2) forms the eighth shaft (8);
the first shifting element (A) is arranged between the third shaft (3) and a housing (GG) of the transmission;
the second shifting element (B) is arranged between the fourth shaft (4) and the housing (GG) of the transmission;
the third shifting element (C) is arranged, within a power flow, between the first shaft (1) and the fifth shaft (5);
the fourth shifting element (D) is arranged, within the power flow, between one of the second shaft (2) and the eighth shaft (8) and the sixth shaft (6) and the eighth shaft (8); and
the fifth shifting element (E) is arranged, within the power flow, between one of the fifth shaft (5) and the seventh shaft (7), the fifth shaft (5) and the eighth shaft (8) and the seventh shaft (7) and the eighth shaft (8).

2. The multi-speed transmission according to claim 1, wherein
a first forward gear results from engagement of the first shifting element (A), the second shifting element (B), and the third shifting element (C);
a second forward gear results from engagement of the first shifting element (A), the second shifting element (B), and the fifth shifting element (E);
a third forward gear results from engagement of the second shifting element (B), the third shifting element (C), and the fifth shifting element (E);
a fourth forward gear results from engagement of the second shifting element (B), the fourth shifting element (D), and the fifth shifting element (E);
a fifth forward gear results from engagement of the second shifting element (B), the third shifting element (C), and the fourth shifting element (D);
a sixth forward gear results from engagement of the third shifting element (C), the fourth shifting element (D), and the fifth shifting element (E);
a seventh forward gear results from engagement of the first shifting element (A), the third shifting element (C), and the fourth shifting element (D);
an eighth forward gear results from engagement of the first shifting element (A), the fourth shifting element (D), and the fifth shifting element (E); and
a reverse gear results from engagement of the first shifting element (A), second shifting element (B), and the fourth shifting elements (D).

3. The multi-speed transmission according to claim 1, wherein the first planetary gearset (RS1), the third planetary gearset (RS3), and the fourth planetary gearset (RS4) are negative planetary gearsets, and the second planetary gearset (RS2) is a positive planetary gearset.

4. The multi-speed transmission according to claim 1, wherein the first planetary gearset (RS1), the second planetary gearset (RS2), the third planetary gearset (RS3), and the fourth planetary gearset (RS4) are co-axially arranged in a sequential order of:
the first planetary gearset (RS1), the fourth planetary gearset (RS4), the second planetary gearset (RS2), and the third planetary gearset (RS3).

5. The multi-speed transmission according to claim 1, wherein the input shaft (AN) is one of axially parallel and at an angle to the output shaft (AB), and one of the first planetary gearset (RS1) and the third planetary gearset (RS3) is located on a side of the transmission housing (GG) facing a drive motor frictionally connected to the input shaft (AN).

6. The multi-speed transmission according to claim 1, wherein the input shaft (AN) is co-axial with the output shaft (AB), and the first planetary gearset (RS1) is located on a side of the transmission housing (GG) facing a drive motor which is functionally connected to the input shaft (AN).

7. The multi-speed transmission according to claim 1, wherein a maximum of one of the first rotatable shaft (1), the second rotatable shaft (2), the third rotatable shaft (3), the fourth rotatable shaft (4), the fifth rotatable shaft (5), the sixth rotatable shaft (6), the seventh rotatable shaft (7) and the eighth rotatable shaft (8) axially passes through a center of all of the first planetary gearset (RS1), the second planetary gearset (RS2), the third planetary gearset (RS3), and the fourth planetary gearset (RS4).

8. The multi-speed transmission according to claim 1, wherein single one of the first rotatable shaft (1), the second rotatable shaft (2), the third rotatable shaft (3), the fourth rotatable shaft (4), the fifth rotatable shaft (5), the sixth rotatable shaft (6), the seventh rotatable shaft (7) and the eighth rotatable shaft (8) axially passes through a center of two of the first planetary gearset (RS1), the second planetary gearset (RS2), the third planetary gearset (RS3), and the fourth planetary gearset (RS4).

9. The multi-speed transmission according to claim 8, wherein the output shaft (AN) axially passes through the center of the first planetary gearset (RS1) and the fourth planetary gearset (RS4).

10. The multi-speed transmission according to claim 8, wherein the output shaft (AN) axially passes through a center of the second planetary gearset (RS2) and the third planetary gearset (RS3).

11. The multi-speed transmission according to claim 1, wherein the third shaft (3) is pivotably supported by a hub fixed to the transmission housing (GG).

12. The multi-speed transmission according to claim 1, wherein at least one of the first shifting element (A) and the second shifting element (B) is at least arranged partially radially about at least one of the first planetary gearset (RS1) and the fourth planetary gearset (RS4).

13. The multi-speed transmission according to claim 1, wherein the first shifting element (A) is axially adjacent the second seconding shifting element (B), and at least one friction element of the second shifting element (B) is located closer to the fourth planetary gearset (RS4) than a friction element of the first shifting element (A).

14. The multi-speed transmission according to claim 1, wherein at least one of the first shifting element (A) is at least partially radially about the second shifting element (B) and the second shifting element (B) is at least partially radially about the first shifting element (A).

15. The multi-speed transmission according to claim 1, wherein the third shifting element (C) is located axially between the second planetary gearset (RS2) and the fourth planetary gearset (RS4).

16. The multi-speed transmission according to claim 1, wherein the third shifting element (C) is axially directly adjacent to the fourth planetary gear set (RS4).

17. The multi-speed transmission according to claim 1, wherein the fourth shifting element (D) is located at least partially axially between the second planetary gearset (RS2) and the third planetary gearset (RS3).

18. The multi-speed transmission according to claim 1, wherein the fourth shifting element (D) is located at least partially radially about the second planetary gearset (RS2).

19. The multi-speed transmission according to claim 1, wherein the fourth shifting element (D) is axially directly adjacent to the third planetary gear set (RS3).

20. The multi-speed transmission according to claim 1, wherein the fifth shifting element (E) is located at least partially axially between the second planetary gearset (RS2) and the fourth planetary gearset (RS4).

21. The multi-speed transmission according to claim 1, wherein the fifth shifting element (E) is located at least partially axially between the second planetary gearset (RS2) and the third planetary gearset (RS3).

22. The multi-speed transmission according to claim 1, wherein the fifth shifting element (E) is located directly axially adjacent to the second planetary gearset (RS2).

23. The multi-speed transmission according to claim 1, wherein the third shifting element (C) is axially adjacent the fifth shifting element (E) and a disc set of the fifth shifting element (E) is located closer to the second planetary gearset (RS2) than a disc set of the third shifting element (C).

24. The multi-speed transmission according to claim 1, wherein one of the third shifting element (C) is at least partially radially about the fifth shifting element (E) and the fifth shifting element (E) is at least partially radially about the third shifting element (C), and a disc set of the fifth shifting element (E) is located at least partially radially about a disc set of the third shifting element (C).

25. The multi-speed transmission according to claim 1, wherein the fourth shifting element (D) is axially adjacent the fifth shifting element (E).

26. The multi-speed transmission according to claim 1, wherein one of:
(a) the fourth shifting element (D) is at least partially radially about the fifth shifting element (E), and
(b) the fifth shifting element (E) is at least partially radially about the fourth shifting element (D), and
(c) a disc set of the fourth shifting element (D) is located at least partially radially above a disc set of the fifth shifting element (E).

27. The multi-speed transmission according to claim 1, wherein a one-way clutch is located between the transmission housing (GG) and one of the input shaft (AN), the output shaft (AB), the first rotatable shaft (1), the second rotatable shaft (2), the third rotatable shaft (3), the fourth rotatable shaft (4), the fifth rotatable shaft (5), the sixth rotatable shaft (6), the seventh rotatable shaft (7) and the eighth rotatable shaft (8).

28. The multi-speed transmission according to claim 1, wherein the input shaft (AN) and the output shaft (AB) are located on opposite sides of the transmission housing (GG).

29. The multi-speed transmission according to claim 1, wherein the input shaft (AN) is located on a common side of the transmission housing (GG) with the output shaft (AB).

30. The multi-speed transmission according to claim 1, wherein at least one of an axle differential and a distributor differential located one of the input shaft (AN) and the output shaft (AB) of the transmission.

31. The multi-speed transmission according to claim 1, wherein a coupling element is located, in the power flow direction, between a drive motor of the motor vehicle and the output shaft (AN).

32. The multi-speed transmission according to claim 31, wherein the coupling element is one of a hydrodynamic converter, a hydraulic clutch, a dry starting clutch, a wet starting clutch, a magnetic particle clutch, and a centrifugal.

33. The multi-speed transmission according to claim 1, wherein vehicle drive is initiated with one of the first shifting element (A), the second shifting element (B), the third shifting element (C), and the fourth shifting element (D), and the input shaft (AN) is coupled to a crankshaft of the drive motor in one of a rotationally fixed and a rotationally flexible manner.

34. The multi-speed transmission according to claim 33, wherein forward vehicle drive and reverse vehicle drive is initiated by engagement of one of the first shifting element (A) and the second shifting element (B).

35. The multi-speed transmission according to claim 1, wherein one of a wear free brake and a power take off is located on at least one of the input shaft (AN), the output shaft (AB), the first rotatable shaft (1), the second rotatable shaft (2), the third rotatable shaft (3), the fourth rotatable shaft (4), the fifth rotatable shaft (5), the sixth rotatable shaft (6), the seventh rotatable shaft (7) and the eighth rotatable shaft (8) for driving at least one of an additional unit, an electrical machine, a generator and an additional driving element.

36. The multi-speed transmission according to claim 1, wherein the first shifting element (A), the second shifting element (B), the third shifting element (C), the fourth shifting element (D), the fifth shifting element (E), are at least one of a non-positive clutch, a non-positive brakes, a disc clutch, a band brake, a conical clutch, a positive clutch, and a positive brake.

* * * * *